United States Patent [19]
Helms

[11] Patent Number: 5,519,592
[45] Date of Patent: May 21, 1996

[54] LOBSTER MEASURING DEVICE WITH FLASHLIGHT

[76] Inventor: Peter M. Helms, 11872 Garnet Cir., W. Garden Grove, Calif. 92645

[21] Appl. No.: 511,462

[22] Filed: Aug. 4, 1995

[51] Int. Cl.⁶ .................................................. F21V 33/00
[52] U.S. Cl. ...................... 362/109; 362/253; 362/457; 33/511; 33/783
[58] Field of Search .................... 362/253, 457, 362/458, 208, 109; 33/511, 783, 806, 810, 828

[56] References Cited

U.S. PATENT DOCUMENTS

| | | |
|---|---|---|
| 1,474,804 | 11/1923 | Tyrrell ........................................ 33/511 |
| 2,798,940 | 7/1957 | Alinat et al. . |
| 2,837,630 | 6/1958 | Shen . |
| 3,042,796 | 7/1962 | DeForest . |
| 3,124,306 | 3/1964 | Schotz . |
| 3,162,376 | 12/1964 | Furuya . |
| 4,114,187 | 9/1978 | Uke ........................................ 362/158 |
| 4,870,550 | 9/1989 | Uke ........................................ 362/158 |
| 4,985,812 | 1/1991 | Uke ........................................ 362/158 |
| 5,097,617 | 3/1992 | Craven ..................................... 33/511 |
| 5,339,532 | 8/1994 | O'Keefe ................................... 33/511 |

*Primary Examiner*—Denise L. Gromada
*Assistant Examiner*—Alfred Basichas
*Attorney, Agent, or Firm*—Robert M. Sperry

[57] ABSTRACT

An improved lobster measuring device comprising a pair of indicator tabs formed integral with or attachable to the front end of a flashlight and projecting forward from the front end of the flashlight and spaced apart a distance equal to the minimum legal length for lobsters.

16 Claims, 2 Drawing Sheets

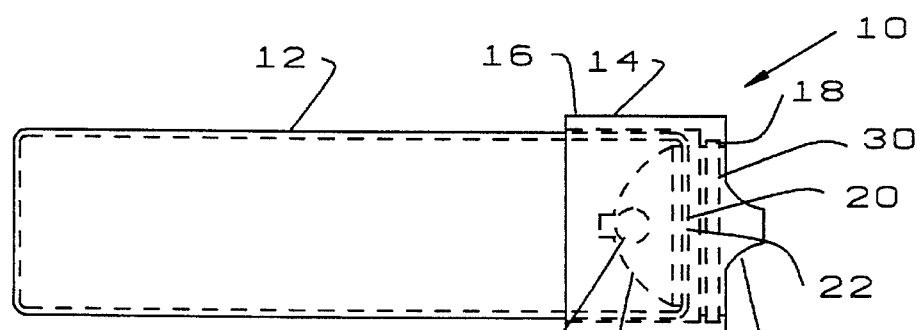
FIG. 1
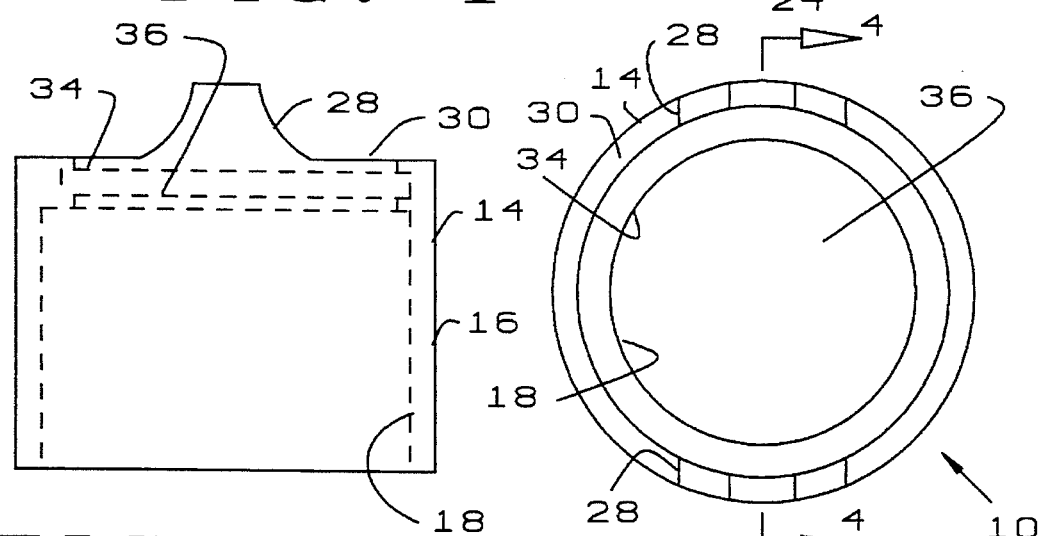
FIG. 2
FIG. 3
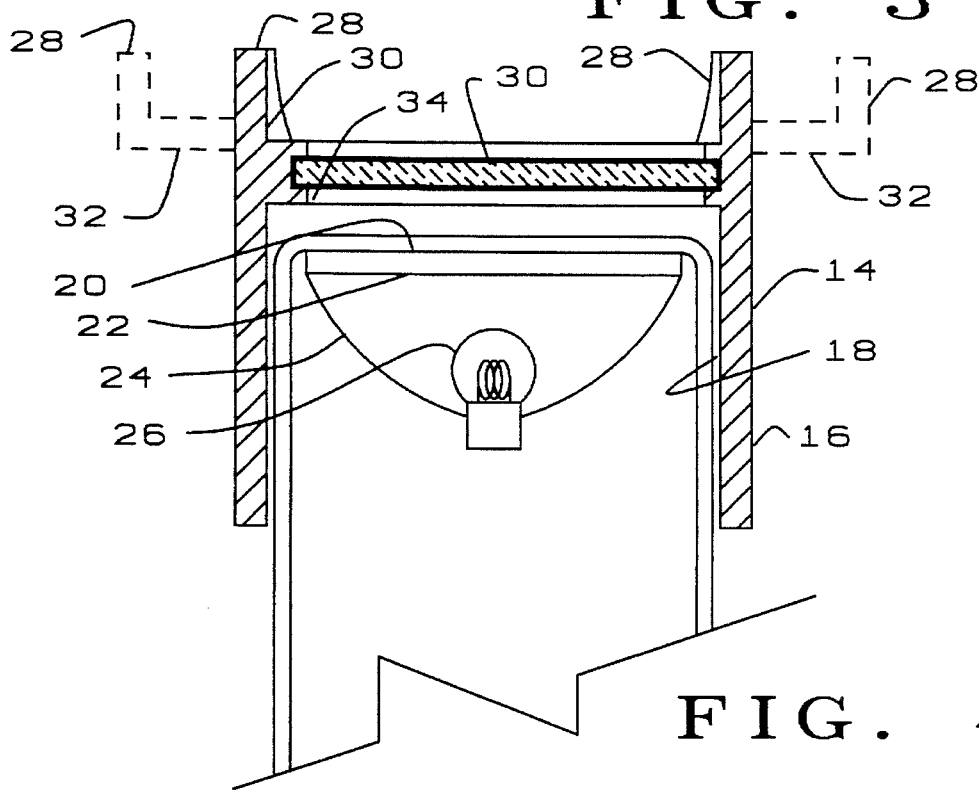
FIG. 4

5,519,592

LOBSTER MEASURING DEVICE WITH FLASHLIGHT

FIELD OF INVENTION

This invention relates to lobster measuring devices and is particularly directed to a flashlight attachment for facilitating underwater measurement of lobsters.

PRIOR ART

As is well known, lobster are highly desirable for eating and are a prime target for scuba divers and the like. However, the taking of lobsters less than a specified size is ecologically unsound and is often illegal. Consequently, it is necessary for divers to measure the lobsters to be certain that the catch is legal. Heretofore, lobster measuring devices have been flat pieces of metal, such as aluminum or stainless steel, formed to indicate the minimum legal length and having a hole for attachment of a lanyard, so that the diver could tie the measuring device to himself and let it dangle until needed, leaving his hands free for other purposes. When the diver located a lobster, the diver would catch and hold the lobster with one hand, grasp the measuring device with the other hand and hold the measuring device against the lobster to measure its length. Unfortunately, lobsters are bottom dwelling creatures which normally hide in caves and crevices during the day and which only leave these hiding places at night to forage for food. Because of the depths at which the lobsters reside, little sunlight penetrates to these depths during the day and, of course, at night it is pitch dark. Consequently, it is necessary for divers to carry waterproof flashlights in order to find the lobsters. However, most flashlights are hand-held. Consequently, the diver had one hand holding the flashlight and, if he caught a lobster with his other hand, he had to find some way to grab the measuring device, hold it against the lobster and maneuver the flashlight so that he could see the size of the lobster—all with one hand, while holding the lobster in the other hand. Obviously, this is an extremely difficult operation. A search in the United States Patent Office has revealed the following:

| U.S. PAT. NO. | INVENTOR | ISSUED |
| --- | --- | --- |
| 2,798,940 | J. R. Chauvin | August 1957 |
| 2,837,630 | Y. T. Shen | June 1958 |
| 3,042,796 | T. de Forest | July 1962 |
| 3,124,306 | O. W. Schotz | March 1964 |
| 3,162,376 | S. Furuya | Dec. 1964 |
| 4,114,187 | A. K. Uke | Sep. 1978 |
| 4,531,187 | A. K. Uke | July 1985 |
| 4,870,550 | A. K. Uke | Sep. 1989 |
| 4,985,812 | A. K. Uke | Jan. 1991 |

Each of these references is subject to the disadvantages discussed above. Thus, none of the prior art lobster measuring devices have been entirely satisfactory.

BRIEF SUMMARY AND OBJECTS OF INVENTION

These disadvantages of the prior art are overcome with the present invention and an improved lobster measuring device is provided which is simple and inexpensive to produce and purchase and does not require the diver to keep one hand free for handling the measuring device, yet which provides rapid, easy and accurate measurement of the lobsters regardless of the available light and which may be built into the flashlight or may be added, as an attachment, to existing flashlights.

These advantages of the present invention are preferably attained by providing an improved lobster measuring device comprising a pair of indicator tabs formed integral with or attachable to the front end of a flashlight and projecting forward from the front end of the flashlight and spaced apart a distance equal to the minimum legal length for lobsters.

Accordingly, it is an object of the present invention to provide an improved lobster measuring device.

Another object of the present invention to provide an improved lobster measuring device which is simple and inexpensive to produce and purchase.

An additional object of the present invention to provide an improved lobster measuring device which does not require the diver to keep one hand free for handling the measuring device, A further object of the present invention to provide an improved lobster measuring device which provides rapid, easy and accurate measurement of the lobsters.

Another object of the present invention to provide an improved lobster measuring device which permits accurate measurement of lobsters regardless of the available light.

An additional object of the present invention to provide an improved lobster measuring device which may be built into a flashlight.

A further object of the present invention to provide an improved lobster measuring device which may be added, as an attachment, to existing flashlights.

A specific object of the present invention to provide an improved lobster measuring device comprising a pair of indicator tabs formed integral with or attachable to the front end of a flashlight and projecting forward from the front end of the flashlight and spaced apart a distance equal to the minimum legal length for lobsters.

These and other objects and features of the present invention will be apparent from the following detailed description, taken with reference to the figures of the accompanying drawing.

BRIEF DESCRIPTION OF THE DRAWING

FIG. 1 is a side view showing a lobster measuring device embodying the present invention mounted on a flashlight;

FIG. 2 is a side end view of the lobster measuring device of FIG. 1;

FIG. 3 is an end view of the lobster measuring device of FIG. 1;

FIG. 4 is a sectional view through the lobster measuring device of FIG. 1, taken on the line 4—4 of FIG. 3.

DETAILED DESCRIPTION OF THE INVENTION

Figure 5:
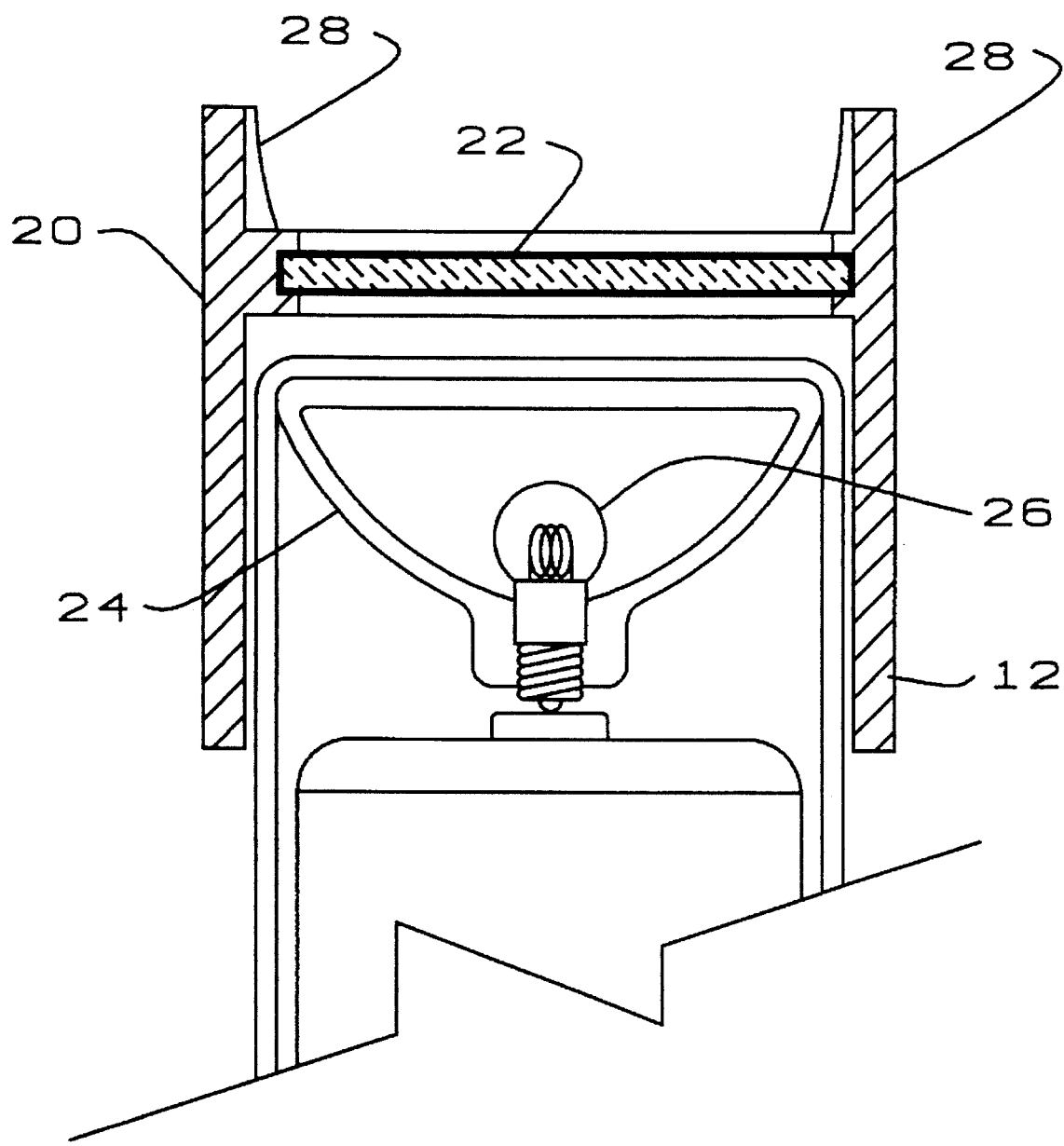
FIG. 5 is a sectional view through a flashlight having the lobster measuring device of the present invention formed integral with the flashlight.

In that form of the present invention chosen for purposes of illustration in the drawings, FIG. 1 shows a lobster measuring device, indicated generally at 10, mounted on a flashlight 12. As best seen in FIGS. 2–4, the lobster measuring device 10 comprises a cylindrical member 14 having a wall 16 enclosing a central passage 18 which is dimensioned to frictionally receive the forward end 20 of flashlight 12, which houses a lens 22, reflector 24 and bulb 26. The lobster measuring device 10 may be formed of rigid or semi-rigid material, such as plastic, metal or rubber-coated metal, and has a pair of indicator tabs 28 projecting forwardly from its leading edge 30 and spaced apart a distance equal to the minimum legal length for taking lobsters. For lantern-type flashlights, this distance will be approximately the same as the diameter of the flashlight. Consequently, the indicator tabs 28 may simply be extensions of the annular wall 16, as seen in FIGS. 1, 2, 3 and 4. For smaller diameter flashlights, the indicator tabs 28 may be mounted on arms 32, projecting outwardly from the leading edge 30 of the annular wall 16, as indicated in dotted lines in FIG. 4. If desired, the indicator tabs 28 may be painted a light-reflecting color, coated with light-reflecting material or formed of uncoated metal, so as to more easily reflect light form the flashlight 12 and to further facilitate measurement of a lobster. Also, if desired, the annular wall 16 may be provided with a pair of internal ridges 34 to support a lens shield 36, formed of transparent material, which provides protection for the forward end 20 of the flashlight 12 and its lens 22.

In use, the diver inserts the forward end 20 of his flashlight 12 into the central passage 18 of the lobster measuring device 10 to cause the cylindrical wall 14 to frictionally retain the forward end 20 of the flashlight 12, as seen in FIG. 1. Thereafter, the diver may use the flashlight in the usual manner. Holding the flashlight 20, in one hand, the diver may search for a lobster and, when a lobster is discovered, the diver can grab the lobster with his free hand and, by merely bringing the forward end 20 of the flashlight 12 into proximity with the lobster, can use the indicator tabs 28 to measure the lobster and determine whether or not the lobster is of legal size. This measurement operation can be performed immediately and conveniently, without requiring the diver to grow an extra hand to grope for the measuring device and to swing it into position to measure the lobster, while still holding the lobster and flashlight. Should the diver desire to remove the lobster measuring device 10 from the flashlight 12, the diver can simply grasp the flashlight 12, with one hand, and the lobster measuring device 10, with the other hand, and by twisting and pulling them in opposite directions, can quickly and easily disengage the forward end 20 of the flashlight 12 from the passage 18 of the lobster measuring device 10.

FIG. 5 shows an alternative form of the present invention wherein the indicator tabs 28 are formed integral with the forward end 20 of the flashlight 12 and project forwardly therefrom. This form of the present invention functions in substantially the same manner as that described above, with respect to the form of the present invention shown in FIGS. 1–4.

Obviously, numerous other variations and modifications can be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. A lobster measuring device for use with a flashlight having a forward end, said measuring device comprising:

a pair of indicator tabs projecting forwardly from said forward end of said flashlight and spaced apart a distance equal to a the minimum legal length for lobsters.

2. The measuring device of claim 1 wherein:

said indicator tabs are formed integral with said flashlight.

3. The measuring device of claim 1 wherein:

said indicator tabs are releasably mounted on said flashlight.

4. A lobster measuring device comprising:

a cylindrical member having a central passage dimensioned to frictionally receive the forward end of a flashlight and formed with a pair of indicator tabs projecting forwardly from said cylindrical member and spaced apart a distance equal to a the minimum legal length for lobsters.

5. The measuring device of claim 4 wherein:

said indicator tabs are mounted on arms extending outwardly from the forward end of said cylindrical member.

6. The measuring device of claim 1 wherein: said indicator tabs are light colored.

7. The measuring device of claim 1 wherein: said indicator tabs are coated with light-reflecting material.

8. The measuring device of claim 1 wherein: said indicator tabs are formed of light-reflecting material.

9. The measuring device of claim 4 wherein: said indicator tabs are light colored.

10. The measuring device of claim 4 wherein: said indicator tabs are coated with light-reflecting material.

11. The measuring device of claim 4 wherein: said indicator tabs are formed of light-reflecting material.

12. The measuring device of claim 4 wherein said cylindrical member is formed of rigid material.

13. The measuring device of claim 4 wherein: said cylindrical member is formed of semi-rigid material.

14. The measuring device of claim 4 wherein: said cylindrical member is formed of metal.

15. The measuring device of claim 4 wherein: said cylindrical member is formed of plastic.

16. The measuring device of claim 4 wherein: said cylindrical member is formed of rubber-coated material.

\* \* \* \* \*